United States Patent
Danieli et al.

(10) Patent No.: US 9,854,935 B2
(45) Date of Patent: Jan. 2, 2018

(54) CARBONATION TUBE

(71) Applicant: Sodastream Industries Ltd., Ben Gurion Airport (IL)

(72) Inventors: Guy Danieli, Jerusalem (IL); Avi Cohen, Jerusalem (IL); Israel Baumberg, Ma'aleh Adumim (IL)

(73) Assignee: SodaStream Industries Ltd., Air Port (IL)

( * ) Notice: Subject to any disclaimer, the term of this patent is extended or adjusted under 35 U.S.C. 154(b) by 0 days.

(21) Appl. No.: 14/846,847

(22) Filed: Sep. 7, 2015

(65) Prior Publication Data
US 2016/0088973 A1    Mar. 31, 2016

Related U.S. Application Data

(60) Provisional application No. 62/057,253, filed on Sep. 30, 2014.

(51) Int. Cl.
| | |
|---|---|
| A47J 31/44 | (2006.01) |
| A23L 2/54 | (2006.01) |
| B01F 3/04 | (2006.01) |
| B01F 15/02 | (2006.01) |

(52) U.S. Cl.
CPC .............. *A47J 31/4403* (2013.01); *A23L 2/54* (2013.01); *B01F 3/04248* (2013.01); *B01F 3/04794* (2013.01); *B01F 3/04801* (2013.01); *B01F 15/0254* (2013.01); *B01F 2003/04432* (2013.01)

(58) Field of Classification Search
CPC ..... A47J 31/4403; A23L 2/54; B01F 3/04801; B01F 3/04248; B01F 3/04794; B01F 15/0254; B01F 2215/0022; B01F 2003/04432
See application file for complete search history.

(56) References Cited

U.S. PATENT DOCUMENTS

| | | | | |
|---|---|---|---|---|
| 2,936,100 A | * | 5/1960 | Chatten | B67D 1/0412 222/396 |
| 3,472,425 A | * | 10/1969 | Booth | B01F 3/04808 137/411 |
| 3,592,367 A | * | 7/1971 | Landis | B67D 1/0051 222/244 |
| 4,298,551 A | | 11/1981 | Adolfsson et al. | |
| 4,399,081 A | | 8/1983 | Mabb | |
| 4,840,014 A | * | 6/1989 | Takehana | B65B 31/046 141/5 |

(Continued)

FOREIGN PATENT DOCUMENTS

| | | |
|---|---|---|
| EP | 73099 | 7/1982 |
| GB | 2046112 | 3/1980 |

OTHER PUBLICATIONS

Lanxess Joining Techniques. pp. 1-38. Published 2006.*
International Search Report for corresponding PCT application PCT / IB2015/056828 dated Jan. 13, 2016.

*Primary Examiner* — Anthony Weier
(74) *Attorney, Agent, or Firm* — Pearl Cohen Zedek Latzer Baratz LLP

(57) ABSTRACT

A home carbonation machine including a gas canister connectable to a carbonation head and a non-metal carbonation tube including an integrally formed metal tip set at distal end thereof and where the carbonation tube is connectable to the carbonation head in order to transport injected carbon dioxide from the gas canister to a bottle of water.

4 Claims, 1 Drawing Sheet

(56) References Cited

U.S. PATENT DOCUMENTS

| | | | | |
|---|---|---|---|---|
| 4,999,140 | A | * | 3/1991 | Sutherland .......... B01F 3/04801 141/18 |
| 5,192,513 | A | * | 3/1993 | Stumphauzer ............ A23L 2/54 222/129.1 |
| 6,149,996 | A | * | 11/2000 | Helgerson ........... A61M 25/001 428/147 |
| 8,985,561 | B2 | * | 3/2015 | Hatherell ............ B01F 3/04794 261/119.1 |
| 2011/0215485 | A1 | * | 9/2011 | Steinberg .................. B01F 3/04 261/64.1 |
| 2013/0037969 | A1 | | 2/2013 | Ring et al. |
| 2013/0214011 | A1 | * | 8/2013 | Vandekerckhove . B67D 1/0829 222/505 |
| 2013/0221029 | A1 | * | 8/2013 | Vandekerckhove ..... B67D 1/04 222/95 |
| 2013/0292857 | A1 | * | 11/2013 | Connors ............. B01F 3/04241 261/30 |
| 2014/0035172 | A1 | * | 1/2014 | Connors ............. B01F 3/04262 261/30 |
| 2014/0262899 | A1 | * | 9/2014 | Mociak .............. B65D 41/0442 206/459.1 |
| 2015/0024088 | A1 | * | 1/2015 | Cohen ....................... A23L 2/54 426/67 |
| 2015/0151258 | A1 | * | 6/2015 | Cohen ................ B01F 3/04815 261/61 |
| 2015/0239725 | A1 | * | 8/2015 | Watts .................. B67D 3/0025 222/1 |

\* cited by examiner

CARBONATION TUBE

CROSS-REFERENCE

This application claims priority from U.S. provisional patent application 62/057,253 filed Sep. 30, 2014 and which is incorporated herein by reference.

FIELD OF THE INVENTION

The present invention relates to home carbonation systems generally and to carbonation tubes in particular.

BACKGROUND OF THE INVENTION

Carbonation tubes are known in the art as a vehicle for injecting carbon dioxide ($CO_2$) into water or any other liquid to form a carbonated beverage.

In home carbonation systems, carbon dioxide is typically pulsed from a gas canister via a carbonation head though a carbonation tube into a bottle of water. The carbonation head typically comprises an activator to press a pin on the gas canister in order to release gas when it is depressed and valves to regulate the pressure during the carbonation process.

SUMMARY OF THE PRESENT INVENTION

There is provided, in accordance with a preferred embodiment of the present invention, a home carbonation machine. The machine includes a gas canister connectable to a carbonation head and a non-metal carbonation tube including an integrally formed metal tip set at distal end thereof and where the carbonation tube is connectable to the carbonation head in order to transport injected carbon dioxide from the gas canister to a bottle of water.

Moreover, in accordance with a preferred embodiment of the present invention, a diameter of an orifice of the carbonation tube is between 0.2 mm and 0.5 mm.

Further, in accordance with a preferred embodiment of the present invention, the metal tip reduces the formation of ice during the carbonation process and where the metal tip is shaped to cut through the ice when formed.

There is provided, in accordance with a preferred embodiment of the present invention, a non-metal carbonation tube including an integrally formed metal tip set at distal end thereof and a connector to connect the tube to a carbonation head.

Moreover, in accordance with a preferred embodiment of the present invention, a diameter of an orifice of the carbonation tube is between 0.2 mm-0.5 mm.

Further, in accordance with a preferred embodiment of the present invention, the metal tip reduces the formation of ice during the carbonation process and where the metal tip is shaped to cut through the ice when formed.

There is provided, in accordance with a preferred embodiment of the present invention, a method for producing carbonated water including reducing the formation of ice during the carbonation of cold water by using a metal tipped non-metal carbonation tube and cutting any ice formed during the carbonation using the metal tip where the metal tip is shaped to cut the ice.

Moreover, in accordance with a preferred embodiment of the present invention, the temperature of the water is below 7° C.

Further, in accordance with a preferred embodiment of the present invention, the temperature of the cylinder of the gas used for the carbonation is greater than 22° C.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
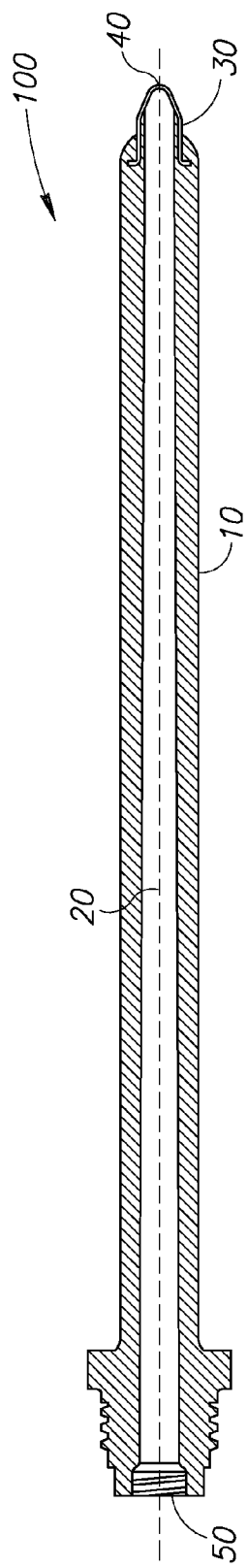
FIG. 1 is schematic illustration of a metal tipped carbonation tube, constructed and operated in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Carbonation tubes that are manufactured for use with home carbonation machines are typically manufactured from plastic with a tip which has the orifice from where the injected carbon dioxide is dispensed.

Applicants have realized that when carbonating using cold water and a warm gas canister, ice may be formed or partially formed at the orifice of the carbonation tube. It will be appreciated that for ice to form during carbonation, cold water may be considered any temperature below 7° C. and a warm gas canister may be considered any temperature above 22° C. It will be further appreciated that any ice formed may block or partially block the orifice, stemming or reducing the flow of $CO_2$ into the water and thus reducing the level of carbonation.

Applicants have further realized that the use of a metal tip at the distal end of the tube may reduce or even prevent this buildup of ice. Applicants have realized that due to the high thermal conductivity of metal, a metal tip may provide greater heat flow from the water to the orifice area of the metal tip preventing the creation of ice. Applicants have also realized that the sticking coefficient of ice on metal is smaller than that of ice on plastic and therefore any ice that has built up may be easily dislodged by the flow of $CO_2$ through the orifice. Applicants have further realized that the sharpness of the metal at the end of the tip may also cut any ice that is formed.

Applicants have also realized that the high velocity flow of $CO_2$ through the carbonation tube may erode the orifice walls of a plastic tip increasing the orifice diameter. It will be appreciated that the smaller the diameter of the orifice, the better the repeatability of the carbonation process. Thus an increase of the diameter of the orifice may affect the resultant repeatability of the carbonation process. It will be appreciated that an optimal diameter for the orifice may be between 0.2 mm-0.5 mm.

Reference is now made to FIG. 1 which illustrates a carbonation tube 100 with a metal tip in accordance with an embodiment of the present invention. Carbonation tube 100 comprises a housing 10, a hollow area 20 a metal tip 30, an orifice 40 and a connector such as a threaded area 50.

Figure 2:
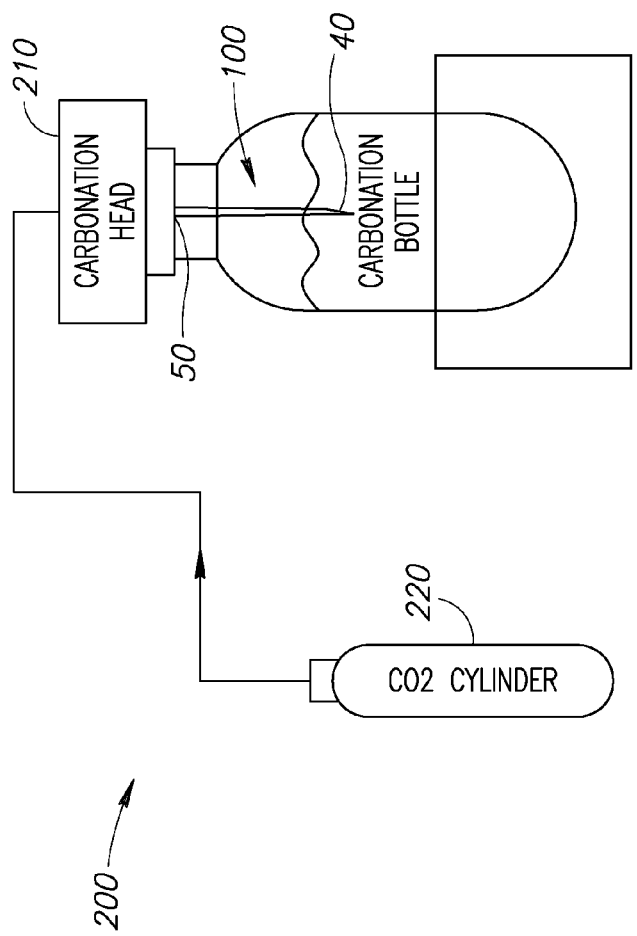
FIG. 2 is a schematic illustration of the metal tipped carbonation tube of FIG. 1 in use with a home carbonation system.

Reference is now made to FIG. 2 which illustrates the use of carbonation tube 100 with a home carbonation system 200. It will be appreciated that during the carbonation process, carbonation tube 100 may connect to a carbonation head 210 via threaded area 50 as described in US Patent Publication 2013-0037969 published 14 Feb. 2014 and assigned to the common assignee of the present invention.

$CO_2$ may be pulsed from a gas canister 220 and may flow via carbonation head 210 through tube 100 via hollow area 20, metal tip 30 and orifice 40 into a bottle of cold water.

It will be appreciated that carbonation tube 100 may be manufactured by insert molding. Metal tip 30 may be inserted into a suitable mold and plastic may be injected over it thus holding it in place and making metal tip 30 an integral part of tube 100 since it cannot be loosened or removed.

Thus a carbonation tube with a metal tip may be used in conjunction with a home carbonation machine to inhibit the generation and buildup of ice during cold water carbonation.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A home carbonation machine, said machine comprising:
    a gas canister connectable to a carbonation head; and
    a plastic carbonation tube having a metal tip molded to the distal end of said carbonation tube, said carbonation tube configured to transport injected carbon dioxide from said gas canister to a bottle of water and configured to extend from above a level of the water in the bottle to below the level of the water, said tip having a single orifice configured to be immersed in the water in said bottle, and wherein a threaded proximal end of said carbonation tube is removably connected to said carbonation head.

2. The home carbonation machine of claim 1 and wherein a diameter of said orifice is between 0.2 mm and 0.5 mm.

3. A plastic carbonation tube comprising:
    a plastic section that is configured to extend from above a level of water to be carbonated to below the level of the water;
    a metal tip having a single orifice and molded to the distal end of the plastic section, said metal tip being configured to be immersed in the water; and
    a connector to removably connect said carbonation tube to a carbonation head of a home carbonation machine.

4. The carbonation tube of claim 3 and wherein a diameter of said orifice of said metal tip is between 0.2 mm-0.5 mm.

* * * * *